United States Patent
Upendran et al.

(10) Patent No.: US 11,558,547 B2
(45) Date of Patent: Jan. 17, 2023

(54) AUTOMATED GUIDE FOR IMAGE CAPTURING FOR 3D MODEL CREATION

(71) Applicant: Hover Inc., San Francisco, CA (US)

(72) Inventors: Manish Upendran, San Francisco, CA (US); William Castillo, San Carlos, CA (US); Derek Halliday, Oakland, CA (US)

(73) Assignee: Hover Inc., San Francisco, CA (US)

( * ) Notice: Subject to any disclaimer, the term of this patent is extended or adjusted under 35 U.S.C. 154(b) by 0 days.

(21) Appl. No.: 17/700,235

(22) Filed: Mar. 21, 2022

(65) Prior Publication Data
US 2022/0217268 A1     Jul. 7, 2022

Related U.S. Application Data (63) Continuation of application No. 17/010,625, filed on Sep. 2, 2020, now Pat. No. 11,310,414, which is a continuation of application No. 16/450,717, filed on Jun. 24, 2019, now Pat. No. 10,805,525, which is a continuation of application No. 15/404,044, filed on Jan. 11, 2017, now Pat. No. 10,382,673.

(51) Int. Cl.
*H04N 5/335*     (2011.01)
*H04N 5/232*     (2006.01)
*G06T 17/00*     (2006.01)

(52) U.S. Cl.
CPC ......... *H04N 5/23222* (2013.01); *G06T 17/00* (2013.01); *H04N 5/23206* (2013.01); *H04N 5/232939* (2018.08); *G06T 2200/08* (2013.01); *G06T 2200/24* (2013.01); *G06T 2200/28* (2013.01); *G06T 2207/30168* (2013.01)

(58) Field of Classification Search
CPC ..................................................... G06T 17/00
See application file for complete search history.

(56) References Cited

U.S. PATENT DOCUMENTS

| | | |
|---|---|---|
| 6,407,777 B1 | 6/2002 | Deluca |
| 8,208,056 B2 | 6/2012 | Fujio et al. |
| 9,333,361 B2 | 5/2016 | Li et al. |
| 9,342,930 B1 | 5/2016 | Kraft et al. |

(Continued)

OTHER PUBLICATIONS

Uppendran, U.S. Appl. No. 15/404,044, filed Jan. 11, 2017, Office Action dated Sep. 27, 2018.

(Continued)

*Primary Examiner* — Gary C Vieaux
(74) *Attorney, Agent, or Firm* — Knobbe Martens Olson & Bear, LLP (57) ABSTRACT

An image capture system provides automated prompts for aiding a user in capturing images for use in 3D model creation. While a user is preparing to capture an image, the system provides visual indications that indicate whether a quality-based condition is satisfied. Based on the visual indications, a user can determine whether an image, if captured, would likely be suitable for use in creating a 3D model. Determining if the quality-based condition is satisfied may include monitoring output generated by one or more sensors and comparing the output against a threshold value. Additionally, the system may analyze the visual content or metadata associated with an image to determine if the quality-based condition is satisfied and request user input to further identify certain image features that were identified by the system.

26 Claims, 8 Drawing Sheets

(56) References Cited

U.S. PATENT DOCUMENTS

| | | |
|---|---|---|
| 9,721,177 B2 | 8/2017 | Lee |
| 9,826,145 B2 | 11/2017 | Malgimani et al. |
| 9,961,260 B2 | 5/2018 | Graham et al. |
| 9,984,499 B1 | 5/2018 | Jurgenson et al. |
| 10,104,282 B2 | 10/2018 | Graham et al. |
| 10,116,861 B1 | 10/2018 | Graham et al. |
| 2007/0030363 A1 | 2/2007 | Cheatle et al. |
| 2007/0147826 A1 | 6/2007 | Matsuzaki et al. |
| 2014/0247325 A1 | 9/2014 | Wu et al. |
| 2014/0369595 A1 | 12/2014 | Pavlidis et al. |
| 2015/0241172 A1 | 8/2015 | Roman et al. |
| 2015/0373264 A1 | 12/2015 | Anzue et al. |
| 2016/0093106 A1 | 3/2016 | Black |
| 2016/0140410 A1 | 5/2016 | Lee et al. |
| 2017/0365135 A1 | 12/2017 | Gupta et al. |

OTHER PUBLICATIONS

Uppendran, U.S. Appl. No. 16/450,717, filed Jun. 24, 2019, Office Action dated Dec. 23, 2019.

Uppendran, U.S. Appl. No. 16/450,717, filed Jun. 24, 2019, Notice of Allowance dated Jun. 10, 2020.

Uppendran, U.S. Appl. No. 16/450,717, filed Jun. 24, 2019, Final Office Action dated Apr. 22, 2020.

AUTOMATED GUIDE FOR IMAGE CAPTURING FOR 3D MODEL CREATION

CROSS-REFERENCE TO RELATED APPLICATIONS; BENEFIT CLAIM

This application is related to:
U.S. application Ser. No. 15/166,587, filed May 27, 2016,
U.S. application Ser. No. 13/624,816, filed Sep. 21, 2012,
U.S. application Ser. No. 14/339,127, filed Jul. 23, 2014,
U.S. application Ser. No. 14/339,992, filed Jul. 24, 2014,
U.S. application Ser. No. 14/610,850, filed Jan. 30, 2015,
U.S. Pat. No. 8,422,825,
the entire contents of each of which is hereby incorporated by reference as if fully set forth herein.

This application is a continuation of U.S. patent application Ser. No. 17/010,625, filed Sep. 2, 2020, which is a continuation of U.S. patent application Ser. No. 16/450,717, filed Jun. 24, 2019 (now U.S. Ser. No. 10/805,525), which is a continuation of U.S. patent application Ser. No. 15/404,044, filed Jan. 11, 2017 (now U.S. Ser. No. 10/382,673), the entire contents of each of which is hereby incorporated by reference as if fully set forth herein, under 35 U.S.C. § 120. The applicant hereby rescinds any disclaimer of claim scope in the parent application(s) or the prosecution history thereof and advise the USPTO that the claims in this application may be broader than any claim in the parent application(s).

FIELD OF THE INVENTION

The present invention relates to the creation of 3D building models and more specifically, to providing an automated guide for capturing images for use in creating 3D models.

BACKGROUND

Three-dimensional (3D) models of a building may be generated based on two-dimensional (2D) digital images taken of the building. The digital images may be taken via aerial imagery, specialized camera-equipped vehicles, or by a user with a camera. The 3D building model is a digital representation of the physical, real-world building. An accurate 3D model may be used to derive various building measurements or estimate design and renovation costs.

However, not all 2D images can produce an accurate 3D model. For example, if the 2D images used to create a 3D model are only of the front of a building, the back of the 3D model of the building is likely to be inaccurate. Similarly, if portions of a building are obscured by other objects in the image, then the obscured portions may not be represented accurately in the 3D model. As another example, if the image capture device was tilted while capturing the photo, the proportions of building features derived from the image may be skewed.

Generating an accurate 3D model from such images may be difficult, time-consuming, or impossible, depending on the quality of the images. In this context, a set of photos is deemed to have "high quality" if deriving an accurate 3D model from the set of photos is possible without extraordinary effort, while a set of photos is deemed to have "low quality" if deriving an accurate 3D model from the set of photos is relatively difficult or impossible. Thus, in this context "quality" does not relate to the artistic or aesthetic value of a photo.

In situations where individuals must travel to the site of a building, take photos of it, and then submit the photos to a 3D modeling service, an enormous amount of resources can be wasted if the photos turn out to be of low quality. In such situations, the amount of effort required to generate an accurate 3D model from the photos may be impractically high. Further, in such cases it may even be necessary to send someone back out to the building site to take a second round of photos. Clearly, it is desirable to avoid such wasted efforts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system is described herein that provides automated prompts for aiding a user in capturing images for use in 3D model creation. Using the prompts, a user can determine whether an image, if captured, would be more likely to be suitable for use in creating a 3D model. In an embodiment, after an image is captured, the system prompts the user to identify one or more objects displayed within the image. The identifiers may be stored in metadata associated with the image and assist in creating an accurate 3D model. Both the image and the metadata may be uploaded to a server computer to be used in creating 3D models.

In one embodiment, while a user is preparing to capture an image, the system performs one or more tests to determine whether a quality-based condition is satisfied. While the quality-based condition is not satisfied, the system displays an indication that the quality-based condition is not satisfied. In an embodiment, when the quality-based condition is satisfied, the system displays an indication that the quality-based condition is satisfied.

Determining if the quality-based condition is satisfied may include monitoring output generated by one or more sensors and comparing the output against a threshold value.

Additionally, the system may analyze the visual content or metadata associated with an image to determine if a quality-based condition is satisfied.

In an embodiment, determining if the quality-based condition is satisfied further includes analyzing the visual content or metadata associated with a plurality of images.

System Overview

Figure 1:
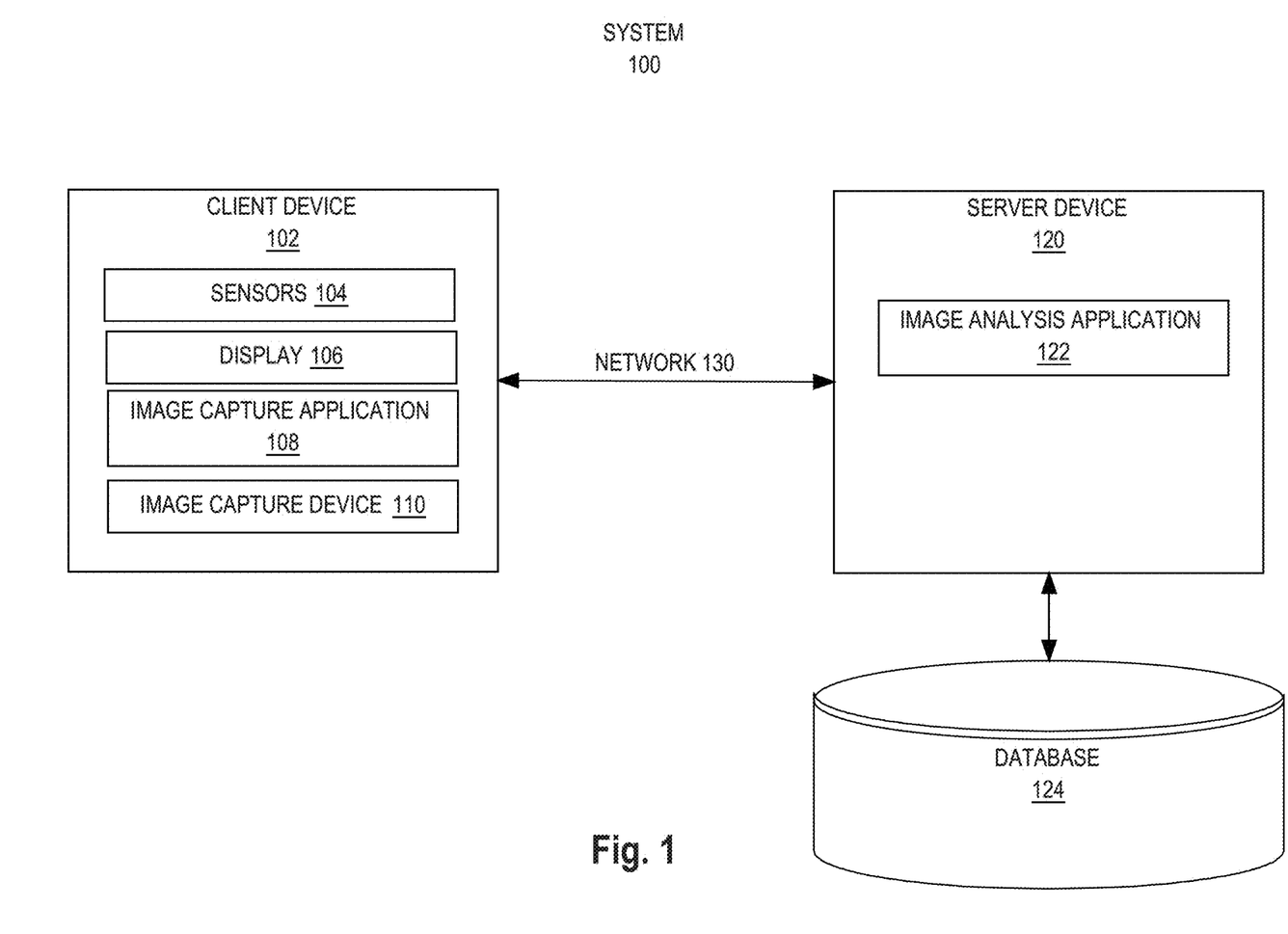
FIG. 1 is a block diagram illustrating an example image capture system.

FIG. 1 illustrates an example system 100 for capturing images for use in creating 3D models. System 100 comprises a client device 102 and a server device 120 communicatively coupled via a network 130. Server device 120 is also communicatively coupled to a database 124. Example system 100 may include other devices, including client devices, server devices, and display devices, according to embodiments. For example, a plurality of client devices may be communicatively coupled to server device 120. As another example, one or more of the services attributed to server device 120 herein may run on other server devices that are communicatively coupled to network 130.

Client device 102 may be implemented by any type of computing device that is communicatively connected to network 130. Example implementations of client device 102 include, but is not limited to, workstations, personal computers, laptops, hand-held computer, wearable computers, cellular or mobile phones, portable digital assistants (PDA), tablet computers, digital cameras, and any other type of computing device. Although a single client device is depicted in FIG. 1, any number of client devices may be present.

In FIG. 1, client device 102 comprises sensors 104, display 106, image capture application 108, and image capture device 110. Client device 102 is communicatively coupled to display 106 for display graphical user interfaces, such as graphical user interfaces of image capture application 108. Display 106 may be configured to display an image to be captured by image capture device 110. Example implementations of a display device include a monitor, a screen, a touch screen, a projector, a light display, a display of a tablet computer or mobile device, a television, and etc.

Image capture device 110 may be any device that can capture or record images and videos. For example, image capture device 110 may be a built-in camera of client device 102 or a digital camera communicatively coupled to client device 102.

According to on embodiment, to determine whether one or more quality-based conditions are satisfied, computing device 102 monitors and receives output generated by sensors 104. Sensors 104 may comprise one or more sensors communicatively coupled to client device 102. Example sensors include, but are not limited to, accelerometers, altimeters, gyroscopes, magnetometers, temperature sensors, light sensors, and proximity sensors. In an embodiment, one or more sensors of sensor 104 are sensors relating to the status of client device 102. For example, an accelerometer may sense whether computing device 102 is in motion. One or more sensors of sensors 104 may be sensors relating to the status of image capture device 110. For example, a gyroscope may sense whether image capture device 110 is tilted.

Image capture application 108 comprises instructions for receiving input from image capture device 110 and transmitting a captured image to server device 120. Image capture application 108 may also provide prompts to the user while the user captures an image or video. For example, image capture application 108 may provide an indication on display 106 of whether a quality-based condition is satisfied.

Client device 102 is connected over network 130 to server 120. Server device 120 receives images and/or videos from computing device 102. Server device 120 may be implemented by any type of computing device that is capable of communicating with a client device over network 130. In system 100, server device 120 is configured with an image analysis application 122 for determining whether a received image or video satisfies one or more quality-based conditions. Image analysis application 122 may be implemented by one or more logical modules or may be part of a cloud computing service. Server device 120 may be configured with other mechanisms, processes, and functionalities, depending upon a particular implementation.

Server device 120 is communicatively coupled to a database 124, which stores images and videos received at server device 120. Database 124 may also store metadata associated with each image or each video. In one embodiment, database 124 is a data storage subsystem consisting of programs and data that is stored on any suitable storage device such as one or more hard disk drives, memories, or any other electronic digital data recording device configured to store data. Although database 124 is depicted as a single device in FIG. 1, database 124 may span multiple devices located in one or more physical locations. Database 124 may be internal or external to server device 120.

Selecting Quality-Based Conditions for the Situation

As mentioned above, while a user is preparing to capture an image using the image capture device, an image capture application determines whether the image, if captured, would satisfy one or more quality-based conditions. In the context of the techniques described herein, a quality-based condition is any condition that affects whether an image would be suitable for use in creating a 3D model.

The quality-based conditions that are important for generating a quality 3D model may vary from situation to situation. For example, for generating a 3D model of a building, the important quality-based conditions may be: whether the building corners are visible; whether the top and bottom of the building are visible; whether building features such as doors, windows, and roofs are visible; whether objects impede the view of the building; whether the image is captured straight-on; and whether the image has good brightness and contrast. On the other hand, the quality-based conditions for other types of target objects may be based on other factors. Therefore, according to one embodiment, techniques are provided for determining which quality-based conditions to use for the current situation.

In an embodiment, one or more quality-based conditions are selected based on the "target object type". The target object type is the type of object for which the 3D model is to be generated. The target object type may be determined automatically by the image capture application by performing an on-the-fly analysis of the image stream that is being captured through the camera's lens as the user aims the camera at an object in preparation to take a picture. In another embodiment, a user may interact with a user interface of the image capture application to explicitly select a target object type, or to modify the object type selected by the image capture application. Based on the target object type, the image capture application may select one or more quality-based conditions.

The target object type is merely one example of a factor that may be used to determine which quality-based conditions apply to any given capture operation. For example, instead of or in addition to the target object type, the one or more quality-based conditions may be selected based on a target angle identified by the image capture application or specified by the user.

Quality Tests Based on Sensor Output

In an embodiment, the image capture application performs one or more tests to determine whether a quality-based condition is satisfied. The one or more tests may include analyzing output generated by one or more sensors and/or analyzing the visual content that would be captured by the image capture device. Example sensors include, but are not limited to, accelerometers, altimeters, gyroscopes, magnetometers, temperature sensors, light sensors, and proximity sensors.

In an embodiment, performing one or more tests to determine whether a quality-based condition is satisfied includes monitoring a sensor and performing comparisons between output generated by the sensor and a threshold. A test may comprise comparing output generated by one sensor, or output generated by a combination of sensors, against a threshold value. In an embodiment, the image capture application may process the output generated by a sensor and compare the processed value against a threshold value. Examples are given hereafter of specific types of sensors and the quality-based conditions whose satisfaction may be determined based on the output of the sensors. However, these examples are not exhaustive and the techniques described herein are not limited to any particular type of sensor/condition combination.

Accelerometer

An accelerometer may output acceleration along three axis. Output generated by the accelerometer may be used to measure the tilt and positioning of an image capture device or computing device. In an embodiment, a quality-based condition may be based on whether the angle of tilt is within a particular range and/or if the image capture device is positioned at a particular orientation. For example, the image capture application may check to see if the image capture device is in a landscape position and not tilted too far forwards or backwards.

Altimeter

An altimeter measures a change in the current relative altitude of the device. Output generated by an altimeter may be used to determine where a user is positioned relative to a multi-level building, or whether the user is capturing an aerial image. In an embodiment, the quality-based condition may be based on whether the user is level with the object being captured. For example, the image capture application may check to see if the image capture device is at ground level of a building.

Gyroscope

A gyroscope measures a rotation rate of the device. Output generated by a gyroscope may be used to determine if an image capture device or computing device is moving. For example, the image capture application may check to see how fast the image capture device is moving and whether the speed is too fast to capture a clear image. Additionally, the roll and yaw values indicated by the gyroscope may be used to determine whether image correction can be applied to the image.

Temperature Sensor

A temperature sensor determines the temperature around the device. Output generated by a temperature sensor may be used to determine whether the device is indoors or outdoors. In an embodiment, one or more sensors, such as the accelerometer or the magnetometer, may be affected by temperatures. The image capture application may adjust the output generated by the one or more sensors based on the measured temperature.

Light Sensor

A light sensor measures how much light is being received by a device. Output generated by a light sensor may be used to determine whether there is sufficient light source to capture an image. For example, the image capture application may check to see whether the image capture device is in a shadowed area, such as under an overhang or tree, or whether the user is taking a photo in good lighting conditions.

Proximity Sensor

A proximity sensor determines if there are any immediate objects in front of or near a device. Output generated by a proximity sensor may be used to determine if the image capture device or computing device is too close to an object being captured. In an embodiment, output generated by a proximity sensor may be used to determine if the user is capturing a close-up image of an object. For example, the image capture application may determine that the user is capturing a close-up image of a door of a building, and adjust the quality-based condition based on the determination, to ensure that sufficient details on or around the door are being captured.

GPS and Magnetometer

In an embodiment, the client device or the image capture device includes a GPS transceiver which may be used to receive signals from three or more for calculating a latitude-longitude position via triangulation. Based on the latitude-longitude position, the image capture application may determine a target object for which captured images are used to generate a 3D model.

In an embodiment, the image capture application may determine, based on the target object and the latitude-longitude position, one or more target locations at which the image capture device or computing device needs to be located to capture an image.

In an embodiment, one or more tests may be based on the latitude-longitude position and output generated by one or more sensors. As an example, a magnetometer measures the relative orientation of the device relative to Earth's magnetic north. The output generated by a magnetometer may be used to determine which way a user is facing relative to a target object, in conjunction with the user's GPS coordinates. In an embodiment, the image capture application may determine, based on the GPS location, which way a user needs to face in order to capture an image.

Quality Tests Based on Image Analysis

As explained above, satisfaction of some quality-based conditions may be determined based on sensor output. Instead of or in addition to sensor-determined conditions, one or more tests to determine whether a quality-based condition is satisfied may involve analyzing the content of visual images. The analysis may occur on-the-fly based on the image stream received through the lens before a photo is captured, or after-the-fact on the captured photo itself.

Example image analysis tests include, but are not limited to: edge detection, feature detection, bounding box detection, and brightness and contrast analysis.

In an embodiment, edge detection may include determining one or more edges of the target object. The image capture application may determine, based on the type of target object, whether all expected edges of the object are visible. For example, if the target object is a building, the image capture application may determine whether the outer edges of the building are visible within the image.

In an embodiment, feature detection may include determining one or more features of the target object. The image capture application may determine, based on the type of target object, one or more expected features or the target object and whether the one or more expected features are visible. Additionally, the one or more expected features may be based on a target angle of the object. For example, if the target object is the front of a building, then the image capture application may determine whether windows and doors are visible within the image.

In an embodiment, bounding box detection may include determining whether the entire object is within the image. The image capture application may generate a bounding box around the target object and determine whether the entire bounding box is within the image frame.

In an embodiment, brightness and contrast analysis may include determining whether the image is bright enough or has enough contrast to detect features or edges within the image. In an embodiment, the image capture application may automatically adjust the brightness and/or contrast of the image in response to determining that the image is not sufficiently bright or contrasted.

In an embodiment, the image capture application performs the image analysis based on a visual representation of the image that would be captured by the image capture device. In another embodiment, the image capture application sends the visual representation to a server device that performs the image analysis and sends a result to the image capture application.

Image Capture Prompts

In an embodiment, while a user is preparing to capture an image, an image capture application may display a visual representation of content that would be captured by an image capture device. In addition, the image capture application may automatically provide one or more prompts for guiding a user in image capture.

In an embodiment, the image capture application repeatedly determines whether a quality-based condition is satisfied. For example, the image capture application may repeatedly perform one or more tests described above to determine if the quality-based condition is satisfied. In some embodiments, the image capture application may perform a plurality of tests to determine whether a plurality of quality-based conditions are satisfied.

In an embodiment, if the quality-based condition is not satisfied, the image capture application displays an indication that the quality-based condition is not satisfied. For example, the indication may include a visual indication such as a text prompt, a color indicator (e.g., red), flashing the display, highlighting portions of the display, or a color or transparency overlay. The indication may include an audio indication such as a notification sound. In some embodiments, an image capture control for the image capture device is disabled while the quality-based condition is not satisfied. The user may not be able to capture an image while the quality-based condition is not satisfied. In an embodiment, the image capture application includes a button or other user interface element that allows a user to capture an image even if the quality-based condition is not satisfied.

In an embodiment, the image capture application may display an indication of the quality-based condition that was not satisfied. For example, if not all portions of the target object are visible, the image capture application may display text indicating that not all of the target object is visible.

In an embodiment, the image capture application may provide instructions or guidance for satisfying the quality-based condition. For example, the image capture application may display text indicating a user should move the image capture device to a particular location or in a particular direction. As another example, the image capture application may provide audio instructions.

Figure 2A:
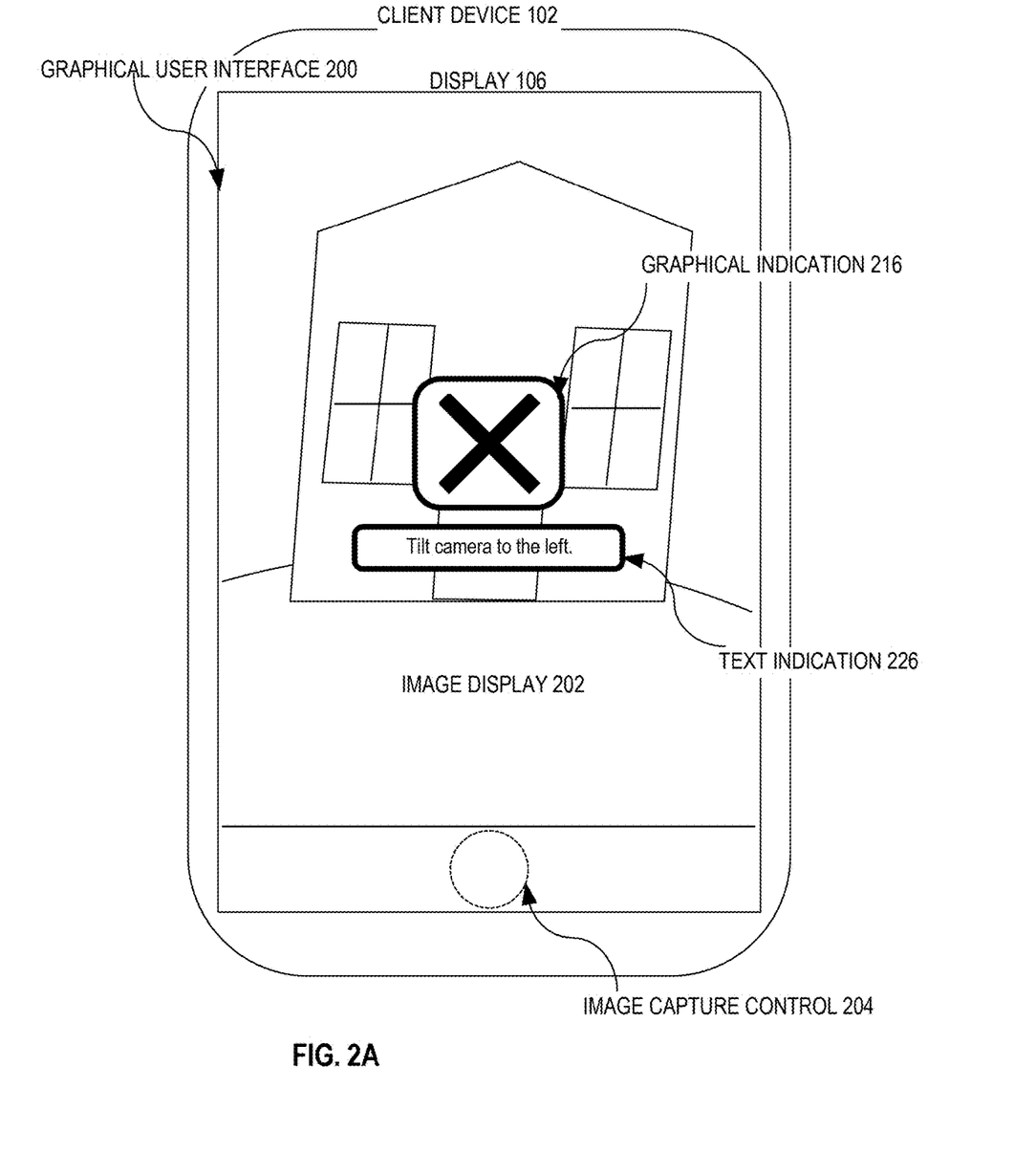
FIG. 2A-B are block diagrams illustrating an example visual indicator of an image capture application while a quality-based condition is not satisfied.

FIG. 2A illustrates an example graphical user interface of an image capture application where the quality-based condition is not satisfied. Display 106 of client device 102 is displaying graphical user interface 200. Graphical user interface 200 comprises an image display 202, an image capture control 204, graphical indication 216, and text indication 226. Image display 202 is a visual representation of the image that would be captured by the image capture device if image capture control 204 were activated. Image display 202 continuously updates to display a real-time visual representation of what is being captured by the image capture device.

In FIG. 2A, image capture control 204 is a button displayed in graphical user interface 200, which when pressed, causes the image capture device to capture an image. In other embodiments, image capture control 204 may be a physical button or switch on the computing device or image capture device.

For the purpose of illustration, assume the quality-based condition is not satisfied because the accelerometer output indicates that the image capture device is tilted. Graphical indication 216 and text indication 226 indicate that the quality-based condition is not satisfied. In the embodiment illustrated in FIG. 2A, graphical indication 216 comprises an "X" mark that visually indicates that the quality-based condition is not satisfied. Text indication 226 comprises text that notifies the user that the camera should be tilted to the left. Additionally in the illustrated example, image capture control 204 is disabled, as indicated by the dotted lines.

Figure 2B:
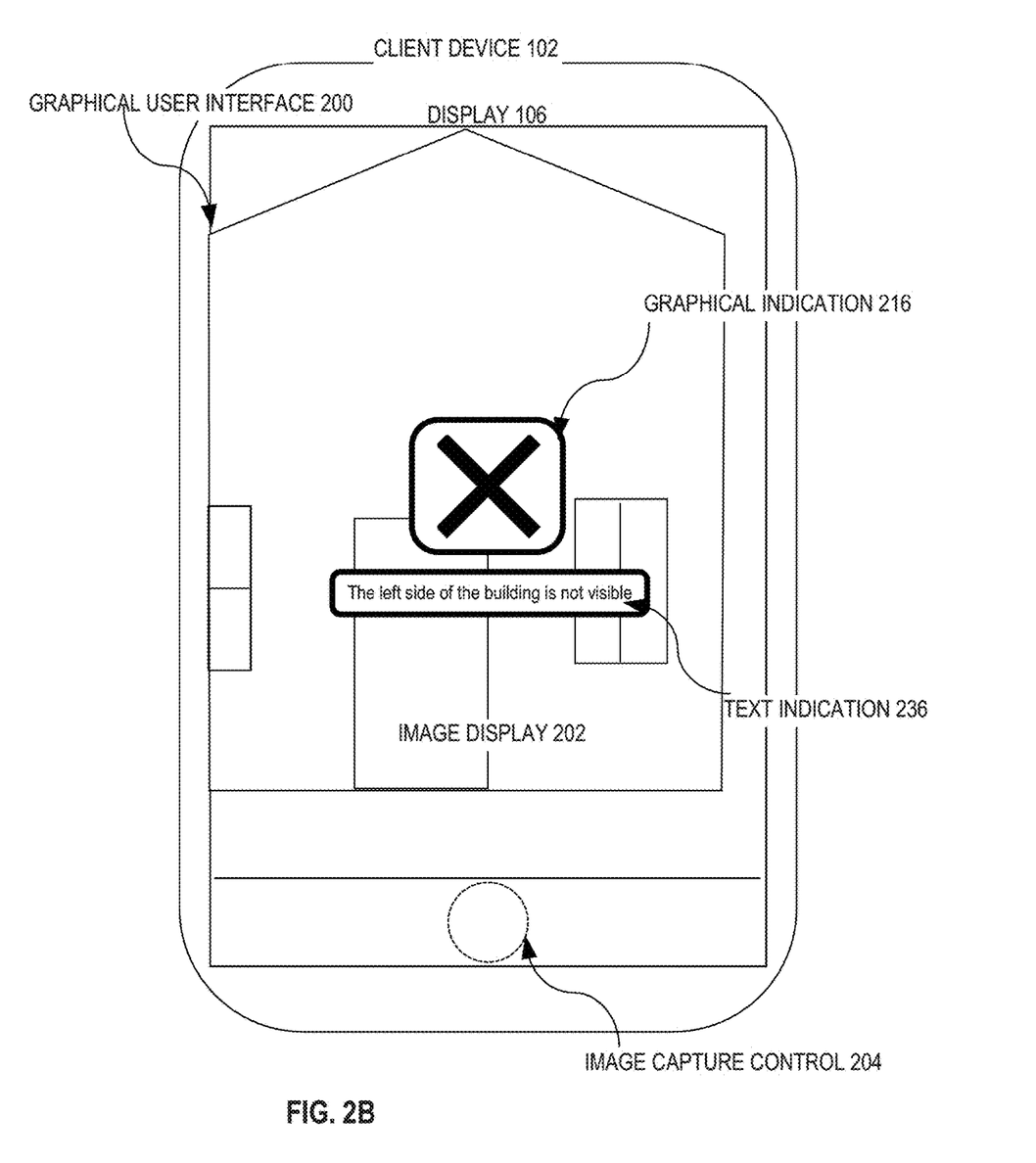

FIG. 2B illustrates another example graphical user interface of an image capture application where the quality-based condition is not satisfied. For the purpose of illustration, assume the quality-based condition is not satisfied because image analysis indicates that not all edges of the target object are visible. Graphical indication 216 and text indication 236 indicate that the quality-based condition is not satisfied. In the embodiment illustrated in FIG. 2B, graphical indication 216 comprises an "X" mark that visually indicates that the quality-based condition is not satisfied. Text indication 236 comprises text that notifies the user that the left side of the building is not visible. Additionally in the illustrated example, image capture control 204 is disabled, as indicated by the dotted lines.

In the illustrated embodiment, a single text indication 226 is displayed. In other embodiments, multiple text or graphical indicators may be displayed if the quality-based condition is not satisfied based on a plurality of tests. For example, if the image capture device is tilted and the target object is obscured, a text or graphical indication corresponding to each issue may be displayed. In an embodiment, the corresponding visual indicator may be removed as the issue is corrected. The quality-based condition is satisfied when all issues are resolved.

In an embodiment, when the quality-based condition is satisfied, the image capture application may display an indication that the quality-based condition is satisfied. For example, the indication may include a visual indication such as a text prompt, a color indicator (e.g., green), or a color or transparency overlay. The indication may include an audio indication such as a notification sound. In some embodiments, an image capture control for the image capture device is enabled while the quality-based condition is satisfied. In some embodiments, rather than displaying an indication that the quality-based condition is satisfied, the image capture application may remove an indication that the quality-based condition was not satisfied.

Figure 3:
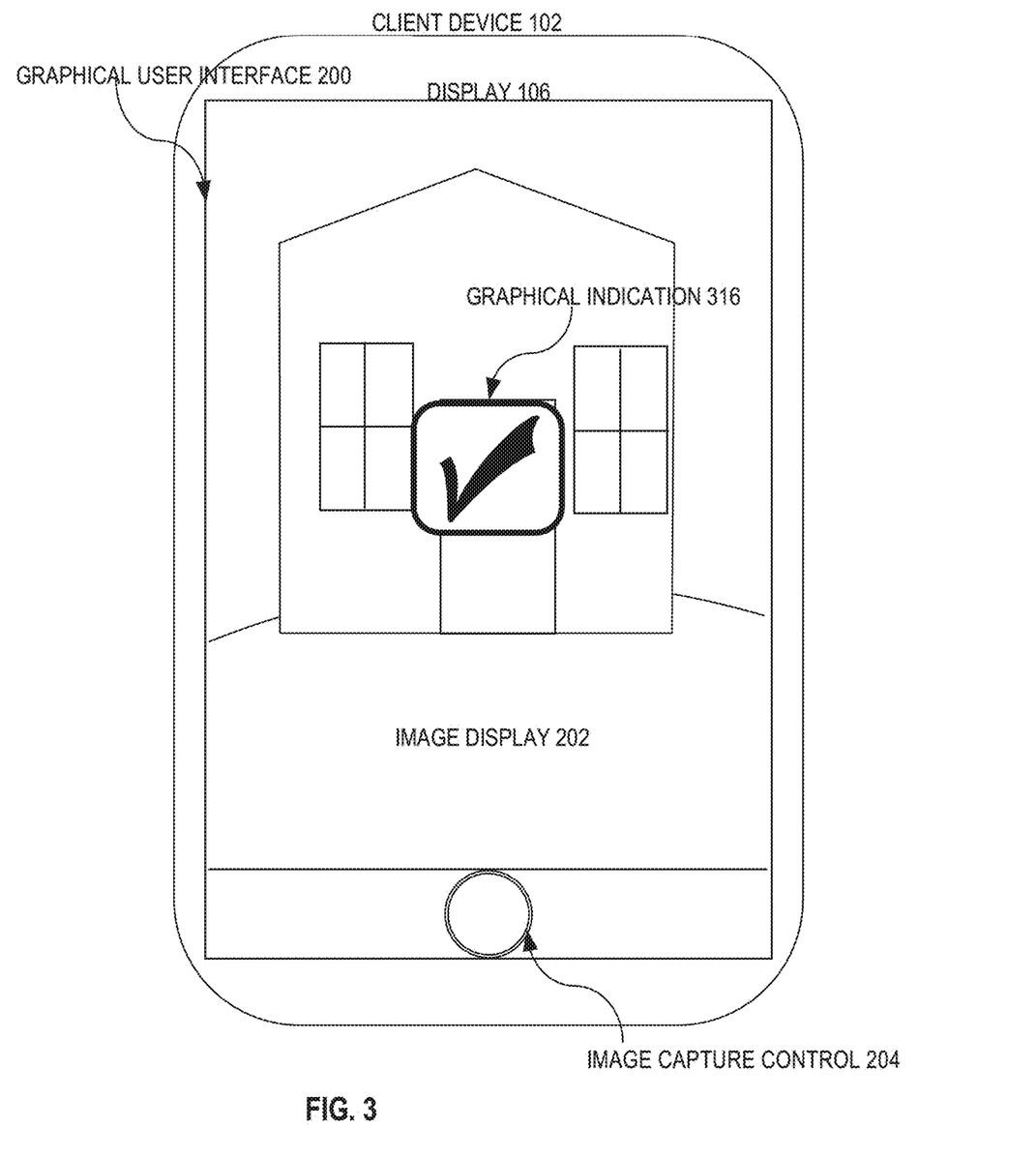
FIG. 3 is a block diagram illustrating an example visual indicator of an image capture application while a quality-based condition is satisfied.

FIG. 3 illustrates graphical user interface 200 after the quality-based condition is satisfied. Updated graphical indication 316 displays a check mark that visually indicates that the quality-based condition is satisfied. Additionally, in the illustrated example, text indication 226 has been removed from graphical user interface 200 and image capture control 204 is re-enabled, as indicated by the solid lines.

In an embodiment, the indication may be a sliding-scale indication that indicates to what extent a quality-based condition is satisfied. A sliding-scale indication may indicate how close the quality-based condition is to being satisfied. In an embodiment, a sliding-scale indication may include a range of visual indicators such as a gradient of colors, a percentage value, and etc. For example, a visual indicator may turn from red to yellow to green as the quality-based condition is closer to being satisfied. Other embodiments may use other types of values or visual indicators. Based on the sliding-scale indicator, a user may capture as close to an optimal image as possible.

For example, if an obstruction is blocking a portion of the target object, a graphical indication may be colored or outlined in red. The graphical indication may be any color along a range of red to yellow to green as a user moves and more of the target object is revealed or obscured. If the target object is fully revealed then the sliding-scale indication may turn green. However, if the target object remains partially obscured, the sliding-scale indication may be a color along the range of colors, depending on how much of the target object is obscured. Thus, if the user cannot position the image capture device so that the entire target object is revealed, the sliding-scale indication may be used to guide the user in selecting the best possible position.

In an embodiment, the sliding-scale indication may be based on the result of comparing output generated by one or more sensors with a threshold value. The indication may correspond to how far the output is from a desired threshold value.

Figure 4:
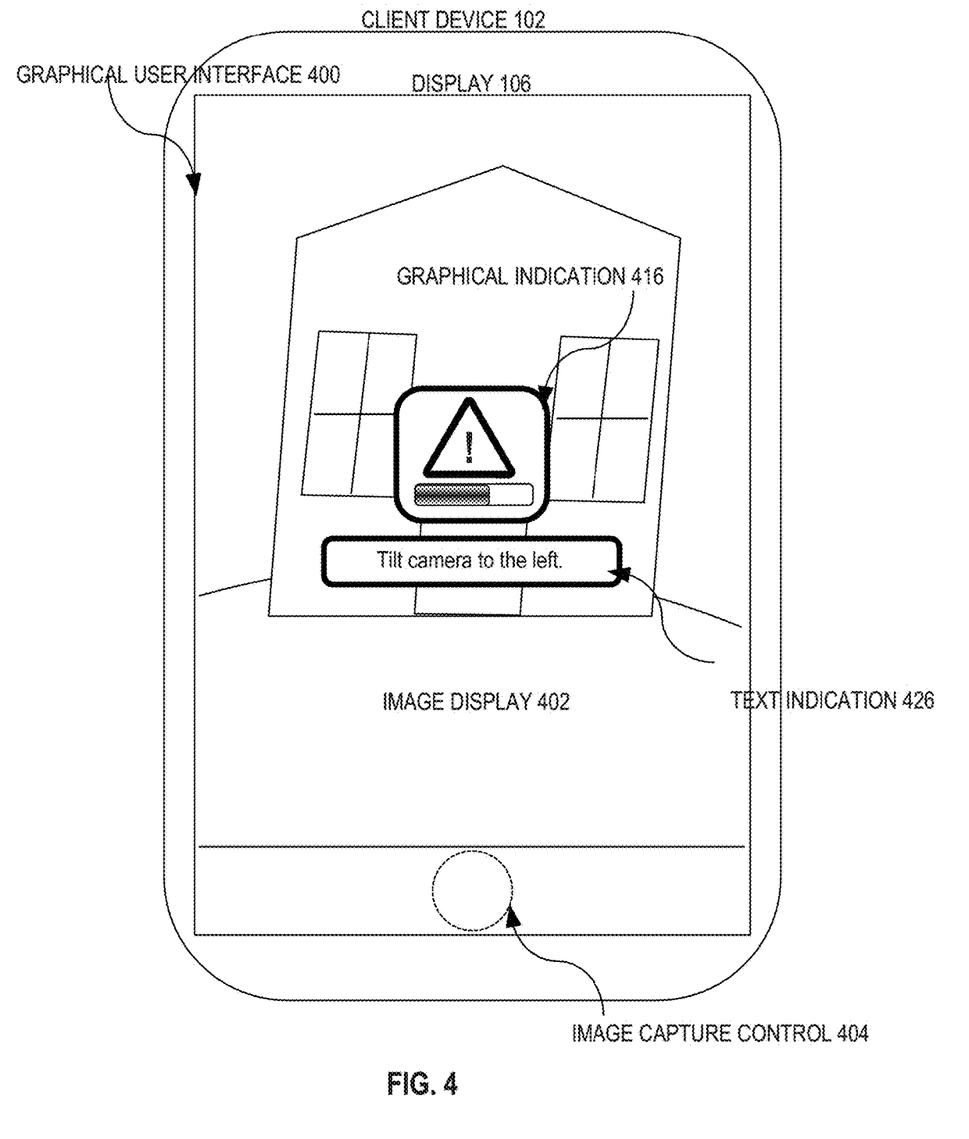
FIG. 4 is a block diagram illustrating an example sliding-scale indicator of an image capture application.

FIG. 4 illustrates an example sliding-scale indicator in a graphical user interface of an image capture application. Display 106 of client device 102 is displaying graphical user interface 400. Graphical user interface 400 comprises image display 402, image capture control 404, graphical indication 416, and text indication 426. Graphical indication 416 is displaying a warning symbol, rather than an X, and a progress bar. The progress bar may decrease as the image capture device is further tilted and may increase as the image capture device becomes more level. Once the progress bar fills, graphical indication 416 may display a check mark similar to FIG. 3. Text indication 426 displays text indicating that the image capture device should be tilted towards the left.

In the illustrated example, image capture control 404 remains enabled, even though the quality-based condition is not fully satisfied. In other embodiments, the image capture application may disable the image capture control 404 if sensor output is too far from the desired threshold value.

Post-Capture Prompts

When the user activates the image capture control, the image capture device captures and stores a digital image. In an embodiment, the digital image is stored in a memory of the computing device. In another embodiment, the digital image is stored in digital storage accessible to the computing device or the image capture device.

In an embodiment, after the image is captured, the image capture application analyzes the image to determine whether an additional quality based condition is satisfied. The quality based condition may be the same as or different from the quality based condition used during image capture. In an embodiment, analyzing the image comprises analyzing the visual content of the image as described above. In another embodiment, analyzing the image comprises analyzing metadata stored with the image, such as metadata describing output generated by one or more sensors when the image was captured. In an embodiment, the image capture application transmits the image to a server that performs some or all of the image analysis and communicates the result to the image capture application.

In an embodiment, if the quality based condition is not satisfied, the image capture application may provide an indication in the display that the quality based condition is not satisfied. The indication may be any audio or visual indication, as described above. Additionally, the image capture application may prompt the user to capture a replacement image.

Post-Capture Feature Identification

In an embodiment, after the image is captured, the image capture application generates one or more visual prompts in the display for the user to specify identifiers for one or more objects depicted in the image. The identifiers may be stored in metadata associated with the image. Additionally, the metadata may correlate coordinates within the image to the identifiers to specify which features within the image correspond to the identifiers. Identifier metadata may be used when creating a 3D model based on the image. For example, the image capture application may allow a user to identify one or more features of a building for use in generating a 3D model of the building.

In an embodiment, the image capture application prompts the user to select an object depicted in the image or a location within the image. After the user selects an object or location, the image capture application prompts the user to specify an identifier for the selected object. The image capture application may prompt the user to select additional objects to identify.

In another embodiment, the image capture application prompts the user to select one or more objects or features that are visible in the image, based on the target object type. For example, if the target object type is a building, the image capture application may prompt the user to select whether windows, doors, gables, siding, or other building features are visible in the image.

Figure 5A:
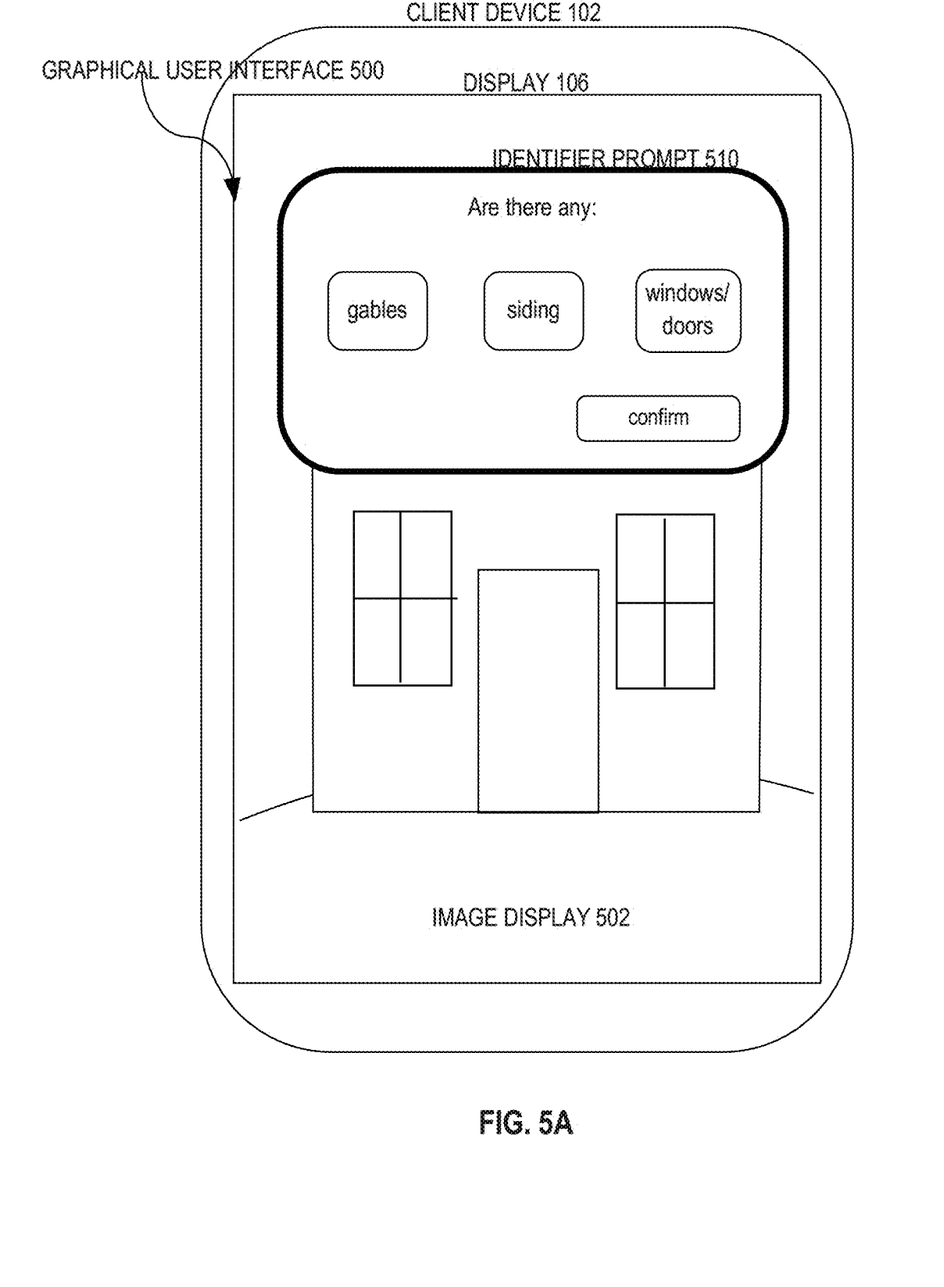
FIG. 5A-B are block diagrams illustrating an example identifier prompt of an image capture application.

FIG. 5A depicts an example identifier prompt of an image capture application. Graphical user interface 500 includes image display 502 and identifier prompt 510. Image display 502 displays the image that was captured and to which identifiers are being applied. Identifier prompt 510 prompts the user to select one or more objects to identify. In the illustrated example, identifier prompt 510 prompts the user to select whether the image contains siding, gables, and/or windows and doors. Identifier prompt 510 also includes a confirmation button.

Figure 5B:
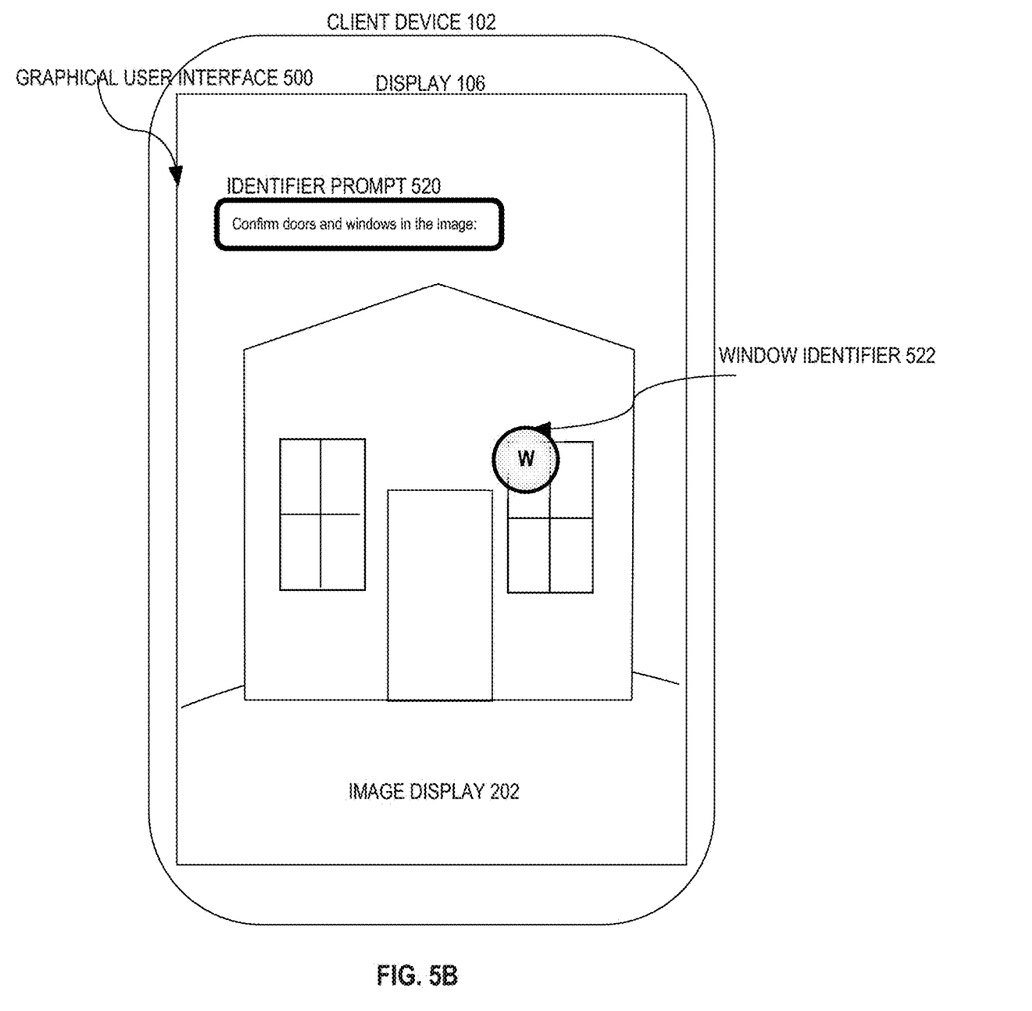

In an embodiment, after the user selects the confirmation button, if the user selected one or more building features, the image capture application may prompt the user to identify the feature within the image. FIG. 5B illustrates an example graphical user interface 500.

Graphical user interface 500 depicts an example feature identification screen. For the purpose of illustration, assume the user selected that the image contains windows and doors. Identifier prompt 520 prompts the user to identify windows and doors within the image. The user may select locations within the image to identify as a window or door. In FIG. 5B, a window has been selected and identified, as shown by window identifier 522.

In some embodiments, the image capture application may automatically identify one or more objects depicted in the image and generate identifiers associated with the one or more objects. The image capture application may indicate the one or more automatically identified objects to the user. The user may then select, confirm, edit, or delete the one or more objects. Additionally, the user may add additional objects and identifiers for the additional objects.

Image Export

After the image is captured, the captured image may be uploaded to server device 120 for storage in database 124 to create a 3D model. The technology described herein is not limited by the method to produce the 3D building model. In other embodiments, the images are stored locally in memory of the image capture device or computing device for local processing, or uploaded to a different computing device or server device for storage, or transmitted from server device 120 to a different computing device or server device for processing.

In an embodiment, uploading the captured image may include uploading metadata associated with the captured image. The metadata may be stored as part of the digital image file for the captured image. The metadata may include output generated by one or more sensors at the time the image was captured, identifier data from the user as described above, user data, and/or target object data.

In an embodiment, the image capture and quality analysis steps may be repeated for a set of images. The set of images may comprise images of the same target object from different angles, viewpoints, and/or distances. The set of images may be uploaded together for use in creating a 3D model. In an embodiment, each image may include metadata that correlates the image with the set of images. For example, metadata may include data identifying a particular user or project with which to associate the image, data identifying the particular view or angle of the image, and/or a sequence number of the image within the set.

Quality Tests Based on Multiple Images

In an embodiment, determining if a quality-based condition is satisfied includes analyzing the visual content or metadata associated with a plurality of images. The plurality of images may be captured while a user is capturing a photo or are previously captured images. For example, the plurality of images may be a series of images received through the lens immediately before or immediately after an image capture control is activated. As another example, the plurality of images may be a plurality of images that are associated with the same user or project. In an embodiment, the plurality of images may be derived from a video. For example, different frames of a captured video may be stored as separate images.

In an embodiment, the image capture application determines a target object type and/or a target angle based on one or more previously captured images. For example, the target object may be the same as the target object for a plurality of previously capture images. The image capture application may determine which additional views or angles of the target object have not been captured. As another example, the image capture application may determine that the target angle was previously captured in an image and notify the user to capture a different angle.

In an embodiment, the image capture application performs the one or more tests on each image of the plurality of image to determine whether the quality-based condition is satisfied. The image capture application may analyze output generated by one or more sensors when each image was captured and/or analyze the visual content of each image.

Additionally, a test may comprise comparing sensor output for a combination of images. For example, sensor output for a combination of images may indicate that a user device was travelling up and down, even though sensor output for a single image may indicate that the user device was stationary when the single image was captured.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
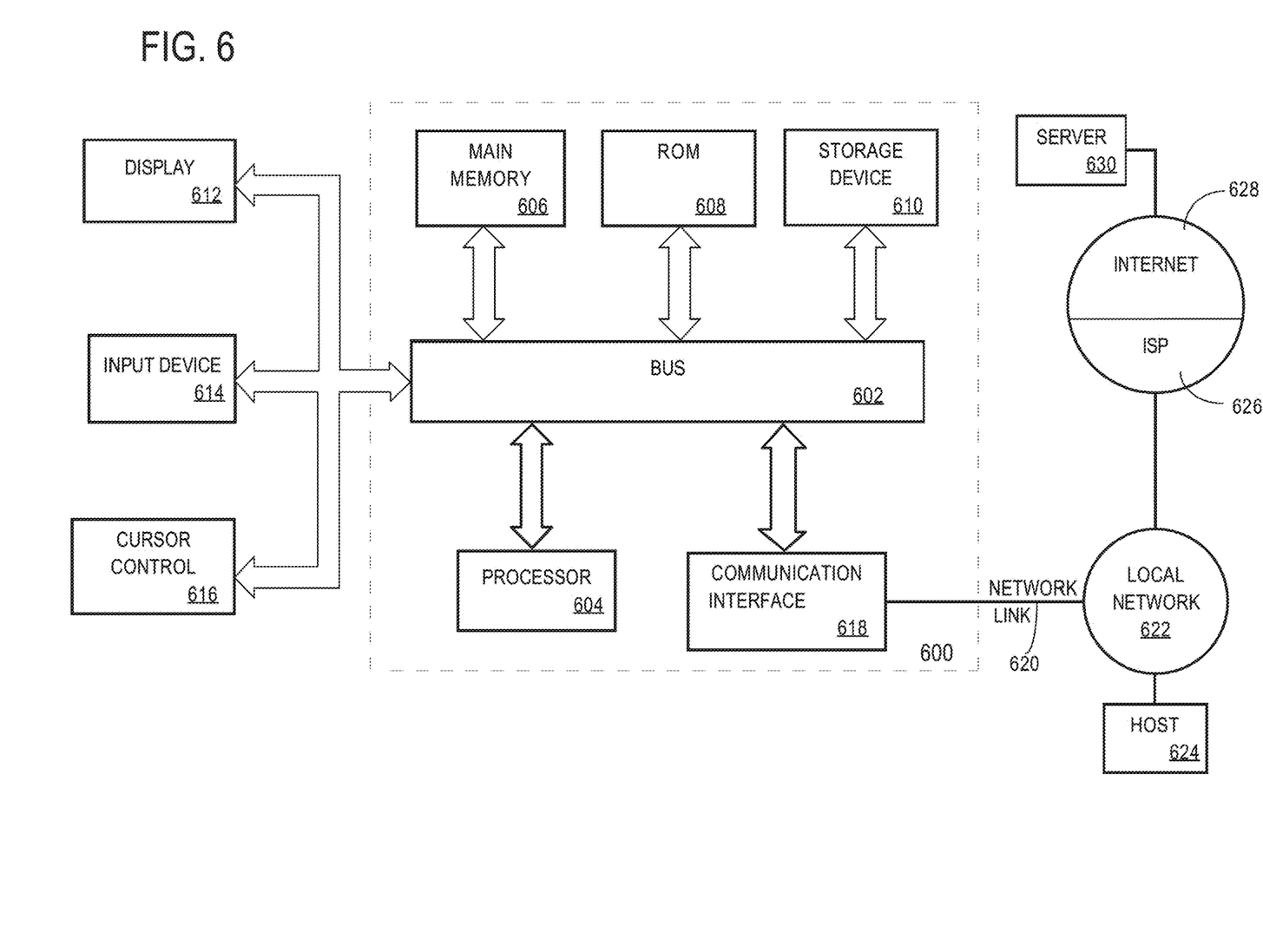
FIG. 6 is a block diagram illustrating a computer system that may be used to implement the techniques described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for capturing images used to create 3D models, the method comprising:
   displaying, on a device, visual content comprising a target object that would be captured as an image if a capture control for the device were activated;
   determining, by one or more processors, whether a quality-based condition is satisfied, wherein determining whether the quality-based condition is satisfied comprises determining, by one or more processors, whether the entirety of the target object is visible in the visual content, wherein determining whether the entirety of the target object is visible in the visual content comprises performing edge detection for the target object, wherein performing edge detection for the target object comprises:
      determining a type of the target object;
      identifying a set of edges associated with the type of the target object; and
      determining whether all of the identified set of edges are visible in the visual content;
   at least while the quality-based condition is not satisfied, displaying, on the device, a visual indication associated with the quality-based condition concurrent with displaying the visual content; and
   capturing the visual content displayed on the device, as an image, in response to activation of the capture control.

2. The method of claim 1, wherein:
   the target object is a building;
   the set of edges comprise one or more outer building edges; and determining, by one or more processors, whether all of the identified set of edges are visible in the visual content comprises determining whether all of the one or more outer building edges are visible in the visual content.

3. The method of claim 1, further comprising:
detecting that the quality-based condition is satisfied; and
in response to detecting that the quality-based condition is satisfied, ceasing to display the visual indication.

4. The method of claim 1, further comprising:
detecting that the quality-based condition is satisfied; and
in response to detecting that the quality-based condition is satisfied, changing an appearance of the visual indication.

5. The method of claim 1, wherein:
the target object is a building; and
determining, by one or more processors, whether the entirety of the target object is visible in the visual content comprises determining whether the visual content comprises one or more of: a corner of the building, a top of the building, or a bottom of the building.

6. The method of claim 1, wherein the visual indication outlines a portion of the visual content.

7. The method of claim 6, wherein the portion of the visual indication outlined is the target object.

8. A method for guiding image capture for 3D reconstruction processes, the method comprising:
displaying, on a device, visual content comprising a target object that would be captured within an image if a capture control for the device were activated;
determining, by one or more processors, whether a quality-based condition is satisfied, wherein determining whether the quality-based condition is satisfied comprises:
identifying a target object type;
detecting at least one line associated with the target object type; and
determining whether all of the at least one line is visible in the visual content;
at least while the quality-based condition is not satisfied, displaying, on the device, a visual indication associated with the quality-based condition concurrent with displaying the visual content; and
capturing the visual content displayed on the device, as an image, in response to activation of the capture control.

9. The method of claim 8, further comprising:
detecting that the quality-based condition is satisfied; and
in response to detecting that the quality-based condition is satisfied, ceasing to display the visual indication.

10. The method of claim 8, further comprising:
detecting that the quality-based condition is satisfied; and
in response to detecting that the quality-based condition is satisfied, changing an appearance of the visual indication.

11. The method of claim 8, wherein:
the target object type is a building; and
determining, by one or more processors, whether the at least one detected line associated with the target object type comprises one or more of: a post of the building, a ridgeline of the building, or a roofline of the building.

12. The method of claim 8, wherein the at least one detected line forms an outline of the target object displayed on the device.

13. The method of claim 12, wherein the outline is disposed entirely within an image frame comprising the visual content.

14. One or more non-transitory computer-readable media storing one or more sequences of instructions that, when executed by one or more processors, cause:
displaying, on a device, visual content comprising a target object that would be captured as an image if a capture control for the device were activated;
determining, by one or more processors, whether a quality-based condition is satisfied, wherein determining whether the quality-based condition is satisfied comprises determining, by one or more processors, whether the entirety of the target object is visible in the visual content, wherein determining whether the entirety of the target object is visible in the visual content comprises performing edge detection for the target object, wherein performing edge detection for the target object comprises:
determining a type of the target object;
identifying a set of edges associated with the type of the target object; and
determining whether all of the identified set of edges are visible in the visual content;
at least while the quality-based condition is not satisfied, displaying, on the device, a visual indication associated with the quality-based condition concurrent with displaying the visual content; and
capturing the visual content displayed on the device, as an image, in response to activation of the capture control.

15. The one or more non-transitory computer-readable media of claim 14, wherein:
the target object is a building;
the set of edges comprise one or more outer building edges; and
determining, by one or more processors, whether all of the identified set of edges are visible in the visual content comprises determining whether all of the one or more outer building edges are visible in the visual content.

16. The one or more non-transitory computer-readable media of claim 14, further comprising one or more sequences of instructions that when, executed by one or more processors, cause:
detecting that the quality-based condition is satisfied; and
in response to detecting that the quality-based condition is satisfied, ceasing to display the visual indication.

17. The one or more non-transitory computer-readable media of claim 14, further comprising one or more sequences of instructions that when, executed by one or more processors, cause:
detecting that the quality-based condition is satisfied; and
in response to detecting that the quality-based condition is satisfied, changing an appearance of the visual indication.

18. The one or more non-transitory computer-readable media of claim 14, wherein:
the target object is a building; and
determining, by one or more processors, whether the entirety of the target object is visible in the visual content comprises determining whether the visual content comprises one or more of: a corner of the building, a top of the building, or a bottom of the building.

19. The one or more non-transitory computer-readable media of claim 14, wherein the visual indication outlines a portion of the visual content.

20. The one or more non-transitory computer-readable media of claim 19, wherein the portion of the visual indication outlined is the target object.

21. One or more non-transitory computer-readable media storing one or more sequences of instructions that, when executed by one or more processors, cause:
- displaying, on a device, visual content comprising a target object that would be captured within an image if a capture control for the device were activated;
- determining, by one or more processors, whether a quality-based condition is satisfied, wherein determining whether the quality-based condition is satisfied comprises:
  - identifying a target object type;
  - detecting at least one line associated with the target object type; and
  - determining whether all of the at least one line is visible in the visual content;
- at least while the quality-based condition is not satisfied, displaying, on the device, a visual indication associated with the quality-based condition concurrent with displaying the visual content; and
- capturing the visual content displayed on the device, as an image, in response to activation of the capture control.

22. The one or more non-transitory computer-readable media of claim 21, further comprising one or more sequences of instructions that when, executed by one or more processors, cause:
- detecting that the quality-based condition is satisfied; and
- in response to detecting that the quality-based condition is satisfied, ceasing to display the visual indication.

23. The one or more non-transitory computer-readable media of claim 21, further comprising one or more sequences of instructions that when, executed by one or more processors, cause:
- detecting that the quality-based condition is satisfied; and
- in response to detecting that the quality-based condition is satisfied, changing an appearance of the visual indication.

24. The one or more non-transitory computer-readable media of claim 21, wherein:
- the target object type is a building; and
- determining, by one or more processors, whether the at least one detected line associated with the target object type comprises one or more of: a post of the building, a ridgeline of the building, or a roofline of the building.

25. The one or more non-transitory computer-readable media of claim 21, wherein the at least one detected line forms an outline of the target object displayed on the device.

26. The one or more non-transitory computer-readable media of claim 25, wherein the outline is disposed entirely within an image frame comprising the visual content.

* * * * *